United States Patent [19]

Schultz et al.

[11] Patent Number: 4,788,555

[45] Date of Patent: Nov. 29, 1988

[54] COMBINED SOLAR AND SIGNAL RECEPTOR DEVICE

[76] Inventors: Donald G. Schultz, 3005 Cerrado Los Palitas, Tucson, Ariz. 85718; William R. Ferrell, 4091 E. 3rd St., Tucson, Ariz. 85711

[21] Appl. No.: 760,076

[22] Filed: Jul. 29, 1985

[51] Int. Cl.[4] .............................................. H01Q 19/10
[52] U.S. Cl. .................................... 343/840; 343/720; 343/909; 126/438
[58] Field of Search ............... 343/761, 840, 781 CA, 343/841, 779, 720, 909; 350/619; 128/418, 424, 438, 451

[56] References Cited

U.S. PATENT DOCUMENTS 1,932,469  10/1933  Leib et al. .......................... 343/765
4,490,981  1/1985  Meckler .............................. 426/425

*Primary Examiner*—Eugene R. LaRoche
*Assistant Examiner*—Seung Ham
*Attorney, Agent, or Firm*—Gregory J. Nelson

[57] ABSTRACT

A parabolic reflector for combined use as a solar concentrator and communications antenna having both a shared and joint use mode. In both the joint and shared use mode, the dish concentrates the electromagnetic energy at the focal point where a signal receptor such as a feed horn and LNA captures the signal. In the shared use system, a heat exchanger is positioned to receive solar flux and the signal receptor is shielded or is in an out-of-the-way position during periods of high solar energy. In a joint use system, the location of the receptor of solar energy and the receptor of electromagnetic energy are separated by use of selective surfaces which selectively reflect and absorb energy. In one embodiment, a wire mesh having a mesh size of less than approximately one-sixteenth of the wavelength of the signal radiation is interposed to reflect electromagnetic energy to the signal receptor but allows solar energy to pass through to impinge upon the heat exchanger.

12 Claims, 2 Drawing Sheets

COMBINED SOLAR AND SIGNAL RECEPTOR DEVICE

The present invention relates to a solar energy collection device and an electromagnetic signal receptor and more particularly relates to the combined use of a reflective parabolic dish as a solar concentrator and as a communications antenna.

The use of individual television receive only (TVRO) stations to capture signals from satellites into orbit around the earth has increased substantially in recent years. The TVRO station generally receives television or microwave signals from satellites. These antenna earth stations include a parabolic dish which concentrate electromagnetic energy at or near the focal point of the parabolic dish. For cassegrain antennas, a reflector is used o produce a folded beam. At or near the reflected concentration point, a receptor is used to capture the concentrated energy. This receptor generally includes a feed horn and amplification means. In the TVRO system, the electromagnetic energy may be as little as one trillionth of a watt. The incident energy is then focused to the feed horn and its adjacent low-noise amplifier. The parabolic dish may be constructed of fiberglass, metal screen or metal screen embedded in a suitable substrate. The dish is typically mounted on a pedestal which may include suitable tracking mechanisms which can change the position of the dish to track various communication satellites.

Separate and apart from the growth and acceptance of TVRO systems, development and utilization of solar energy devices has occurred. Various types of solar energy devices can be found in the prior art and one such device is the conventional flat plate solar collector. Concentrating collectors using parabolic reflectors along with sun tracking mechanisms in connection with various systems for collecting and converting the solar energy represent an improvement over the flat plate designs. Generally, such devices achieve maximum energy collection throughout the day by tracking the sun and reflecting the sun's rays toward a suitable heat exchanger which preferably has a suitable absorber surface such as an acylic latex flat black coating.

From the foregoing, it will be apparent that in both communications and solar applications, parabolic reflectors are used to concentrate energy at a selected concentration point. In solar systems, with incident solar power up to 1,000 watts per meter squared, the parabolic dish must have a highly reflective mirror-like surface to concentrate the sunlight and focus it onto a receptor. In the solar application, the receptor may be part of the device in which the energy is used as in a solar cooker or furnace or may be indirectly coupled to a utilization device through a heat exchanger medium. In either case, high solar flux density and high heat flow to the receptor are desired. High temperatures result unless provision is made to cool the receptor as, for example, by circulating fluid through the receptor to extract heat.

By contrast, in communication systems, the incident electromagnetic energy level is very small yet parabolic dishes are used in a similar manner to focus the energy to the feed horn and its associated amplifier.

Briefly, the present invention contemplates the combined use of a parabolic reflector or dish for solar energy collection and electromagnetic signal reception. The parabolic dish is provided with a highly reflective surface which focuses solar radiation on a suitable receptor such as a heat exchanger. In order to make the same antenna compatible with both solar and signal concentration applications, the dish, signal receptor and heat receptor are arranged so that radiant energy is not focused on the signal receptor. In one embodiment of the present invention, the combined use is shared. In the shared mode of operation, the dish is used during the day or periods of high solar flux as a solar concentrator with a heat receptor suitable for the particular application. At night time, or other times, when solar radiation is insufficient, the signal receptor, such as the feed horn and LNA's, are located at the focus of the parabolic dish. This arrangement is reversed when solar radiation increases to a pre-determined level at which level damage could occur to the signal receptor. In the alternate embodiment of the invention, which is termed "joint use", the reflective parabolic dish is used as either a solar concentrator or signal antenna, or both during daylight hours. In the joint use mode, the receiving locations for solar flux and the electromagnetic energy are separated by means of surfaces which selectively reflect and absorb the two different types of radiation or energy.

A more complete understanding of the present invention along with various objectives and advantages will be appreciated from the following description, claims and drawings in which:

Figure 1:
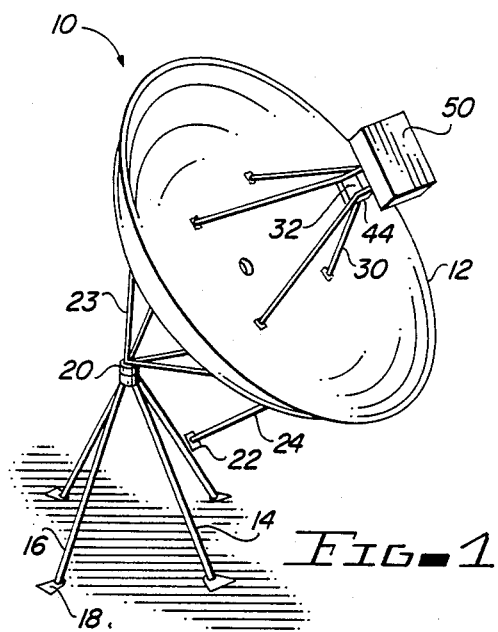
FIG. 1 is a perspective view of a typical parabolic reflector embodied in a TVRO antenna system.
Figure 2:
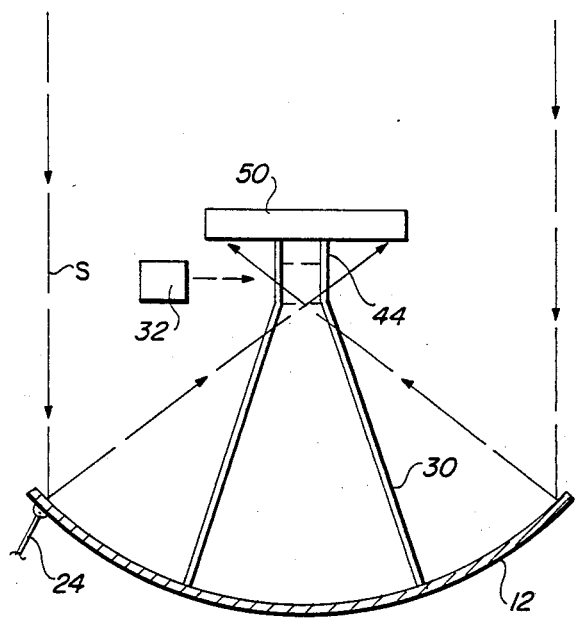
FIG. 2 is a modification of the reflector allowing shared use both as a solar concentrator and as a signal receptor for electromagnetic energy.

Turning now to the drawings, FIGS. 1 and 2 illustrate a combined signal receptor according to the present invention which is generally designated by the numeral 10. The device 10 includes a generally parabolic dish 12 of suitable diameter. Typical dishes have a diameter of eleven and thirteen feet. Dish 12 is preferably constructed of panelized aluminum, metal screen or metal screen embedded in a substrate such as fiberglass and provided with a highly reflective surface. The dish is supported on a pedestal 14 which consists of a plurality of legs 16 having ground pads 18 for securement at a suitable installation cite. The legs converge to a universal joint 20 which connects to supports 23 attached to the rear surface of the dish 12. Remote adjustment of the dish is achieved by controller 22 having a control arm 24 which attaches to the edge of the dish. Controller 22 may be a hydraulic motor or may be an appropriate electronic controller which is programmable. Controller 22 is adapted to adjust the dish to align with signals from various satellites or to position the dish for maximum solar radiation and is adapted to control both azimuth and elevation providing two degrees of freedom. Controllers of this type are well known in the art and further detailed discussion is not deemed necessary to an understanding of the invention.

As is conventional with TVRO's, a signal receptor 32 including a feed horn and amplifier such as an LNA, are positioned at the end of support arms 30 in the center of the antenna at the approximate focal point of the dish to collect signals reflected by the dish. This arrangement is generally known as a direct feed antenna. The present invention will also work equally well with cassegrain antennas which utilize subreflectors to receive and redirect electromagnetic energy as will be explained.

Spaced outward from the signal receptor 32 is a heat exchanger 50. Heat exchanger 50 is supported on mounting brackets 44 which are extensions of support arms 30. Heat exchanger 50 may be any conventional type of heat exchanger or heat receptor. For example, heat receptor 50 may consist of a suitable heat absorbant vessel with a blackened coating having an inlet and an outlet for heat exchanger media which during periods of use may be circulated through the heat exchanger. Alternatively, the heat receptor may be in the form of solar cells which would be impinged by solar radiation and establish a photovoltaic current.

As best seen in FIG. 2, the heat receptor 50 is spaced away from the signal receptor and also the focal point of the parabolic reflector 12. The signal receptor 32 is removably positioned between brackets 44 at approximately the focal point of the reflector. Thus, this configuration is a shared use configuration in which the amplifier and feed horn, constituting the signal receptor, are out of use during periods of substantial solar radiation to prevent damage to the signal receptor 32. During periods of daylight, solar radiation impinges upon the reflective surface of the parabolic reflector 12 and is redirected by the surface towsrd the heat receptor 50. Since heat transfer, rather than high temperature is critical, the heat exchanger is located sufficiently near the focus in a region of high solar flux to achieve heating. At night or during periods of low solar radiation, the signal receptor 32 is inserted between the supporting brackets 44 at the focal point of the parabolic reflector and the dish appropriately aimed at a satellite or other signal source by means of controller 22 so that the device can properly function as a TVRO system.

Figure 3:
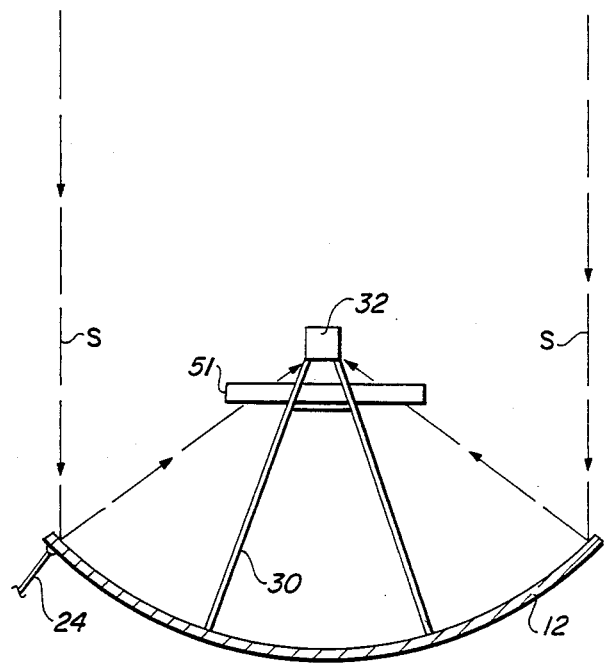
FIG. 3 is an alternate embodiment of the shared use arrangement.

In FIG. 3, an alternate embodiment of the present invention is illustrated. In this figure and subsequent figures, for convenience, like elements are designated by the same numeral. Again, the device 10 is generally constructed as shown in FIG. 1 having parabolic reflector 12 supported on an appropriate base not shown. Again, a controller is adapted to adjust the position of the dish 12 through arm 24. Supports 30 extending from the front or reflective surface of dish 12 support the signal receptor assembly 32 at a central position spaced away from the parabolic surface. A suitable heat exchanger 51 is detachably interposed between the parabolic reflector 12 and signal receptor 32. Heat exchanger 51 is detachably secured to the supports 30 by bolts or suitable brackets. During periods of high solar flux, the solar radiation is re-directed as shown by the arrows toward the heat exchanger 51 where heat energy is concentrated and may be used in conventional manner to heat a working fluid, generate photovoltaic energy or the like. At night or during periods of low solar energy, the heat exchanger 51 may be removed so the signal receptor 32 can receive the reflected electromagnetic energy when the dish is properly directed towards a satellite or other signal source by positioning arm 24.

Figure 4:
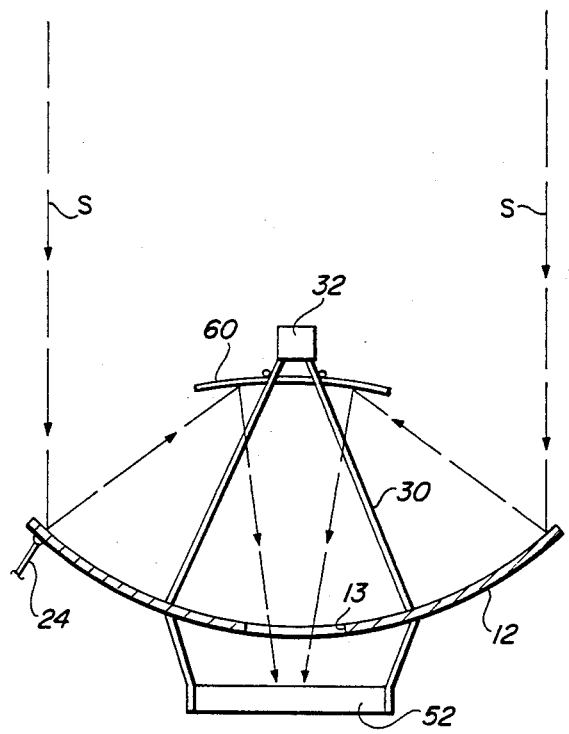
FIG. 4 is an alternate embodiment showing another shared use arrangement.

In FIG. 4 another embodiment of the invention is shown in which the parabolic dish 12 defines a central aperture 13. The dish is again adjustable or positionable by means of arm 24. Heat exchanger 52 is positioned adjacent the rear surface of the dish 12 and is centrally aligned with aperture 13. Again, the signal receptor assembly 32 including feed horn and amplifier are positioned on a central axis spaced from the front or reflective surface of the dish 12 on convergent support arms 30. Interposed between the feed horn and amplifier 32 and the reflective surface of the dish 12 is an arcuate reflector 60 having a curvature adapted to re-direct reflected radiation through the aperture 13 to impinge upon the heat exchanger 52, as indicated by the arrows. This arrangement is adaptable to the cassegrain type of antenna which uses a sub-reflector. At night time or other times of low solar radiation, the sub-reflector 60 may be removed to allow the reflected electromagnetic energy to be directly received by the feed horn at assembly 32.

Figure 5:
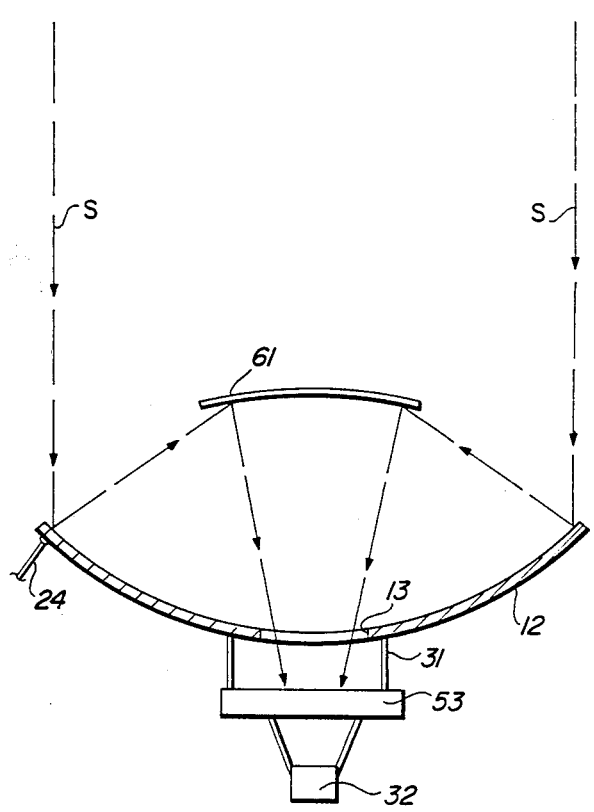
FIG. 5 shows still another embodiment of a shared use arrangement.

In FIG. 5, which illustrates another shared use arrangement, both the heat exchanger 53 and the signal receptor assembly 32 are located at the rear of the reflective dish 12 with the heat exchanger 53 interposed between the dish and the signal receptor on arms 31. The dish 12 is again adjustable by means of controller arm 24. A parabolic sub-reflector 61 is spaced in front of the reflective surface of dish 12 and serves to redirect energy through a central aperture 13 in the dish. During periods of intense solar energy, the solar energy is redirected by reflector 61 onto a surface of heat exchanger 53. During periods of low solar radiation and at night, the heat exchanger 53 may be detached from support arms 31 to permit electromagnetic energy to be directed to the feed horn portion of the signal receptor assembly 32.

The foregoing configurations and embodiments of the invention have been characterized as "shared use" in which one of the components must be detached or operatively removed to permit an alternate operational mode. The following embodiments of the invention are characterized as "joint use" devices. In the shared use mode of operation, the user determines which mode of operation is most desirable, solar energy collection or signal reception. The problem, as pointed out above, is that the feed horn and amplifier assembly may become damaged by solar radiation due to the fact that the signal source, when it is a satellite, is in a stationary equatorial orbit to the south of the United States. The sun at certain times of the year will be in the region of the signal source. Thus, the parabolic dish may be receiving intense solar flux at the same time as it is receiving electromagnetic signal from a satellite. The mirror-like surface of the dish will then be reflecting both signals which could cause damage to the amplifier and feed horn if it happened to be at or near the optical focus.

The present embodiment of the invention provides a solution to this problem by separating the locations at which the electromagnetic signal and the solar flux are received by the signal receptor and by the heat exchanger, respectively. This is accomplished by means of surfaces which selectively reflect and absorb the two types of radiation. Wire mesh is relatively transparent to light. On the other hand, if the mesh size is less than approximately one-sixteenth of the wave length of the signal radiation, the mesh appears essentially as a solid surface to radiation. In a somewhat similar manner, black metal surfaces absorb light energy without reflection but can also reflect longer wave length signal energy. The above-described phenomena provides the basis for the shared use designs described below and illustrated in FIGS. 6 through 8. Again, the same numerals are used to identify the same or similar elements.

Figure 6:
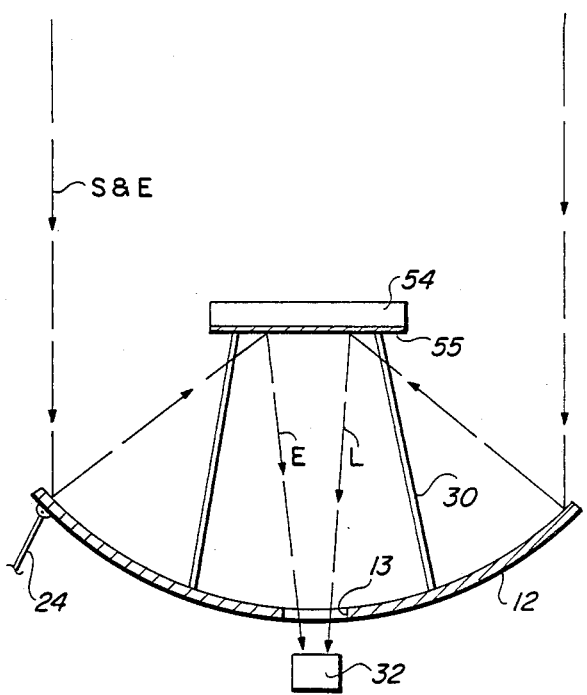
FIG. 6 is an alternate embodiment of the present invention which illustrates the combined antenna and solar collector for joint use operation.

In FIG. 6, dish 12 is of parabolic design having a reflectorized front surface. The position of the dish is controlled by control arm 24 connected to a suitable controller or servo motor. Heat exchanger or receptor 54 is spaced apart from the front reflectorized surface of the dish 12 a pre-determined distance at the approximate focal point of the reflector and supported by arms 30. Heat exchanger 54 is preferably coated with a black absorber surface 55 such as flat balack heat-resistant paint. The surface 55 of the heat absorber disposed toward the reflective surface of the parabolic reflector serves as a secondary reflector in a cassegrain antenna design. Central aperture 13 provides a pathway for redirected electromagnetic energy. As shown, solar energy (S) and electromagnetic (E) are reflected from the surface 12 of the parabolic reflector to the surface 55 of the heat exchanger. Solar energy is absorbed by the heat exchanger and electromagnetic energy is redirected via aperture 13 to the signal receptor 32.

Figure 7:
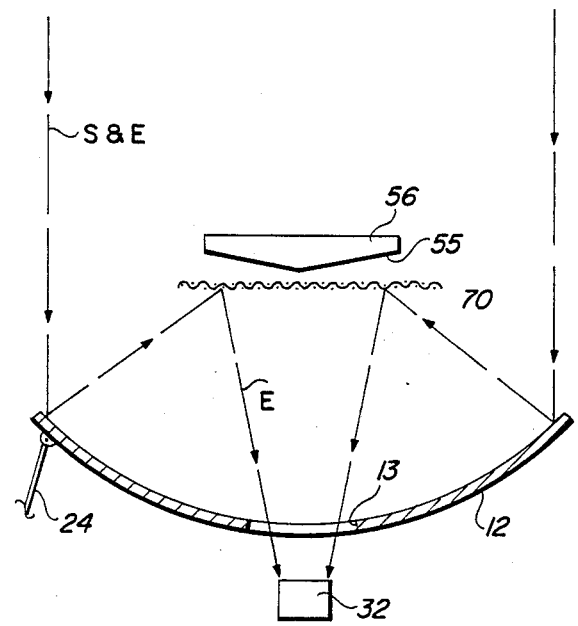
FIG. 7 is an alternate embodiment of the present invention illustrating joint use operation as a solar and signal reflector.

In FIG. 7 the parabolic dish 12 is again of Cassegrain design having a central aperture 13. The position of the dish is adjustable by means of control arm 24. Feed horn and amplifier assembly 32 is again located at the back of the dish 12. Heat exchanger 56 is spaced a predetermined distance from the reflective surface of the parabolic dish 12 beyond the focal point of the parabola. A screen 70 having a mesh size of less than one-sixteenth of the wave length of the signal radiation is interposed at the approximate focal point of the dish 12. Screen 70 acts as a secondary reflector to reflect the electromagnetic energy (E) to the feed horn and amplifier assembly located at the rear of the dish. Solar energy passes through the screen 70 to impinge upon the surface 55 of the heat exchanger 50 which is preferably coated with a suitable black absorbant coating. In FIG. 7, the exposed surfaces 55 of the heat exchanger are angularly disposed with respect to the plane of the screen 70 to minimize re-radiation to the feed horn and amplifier.

Figure 8:
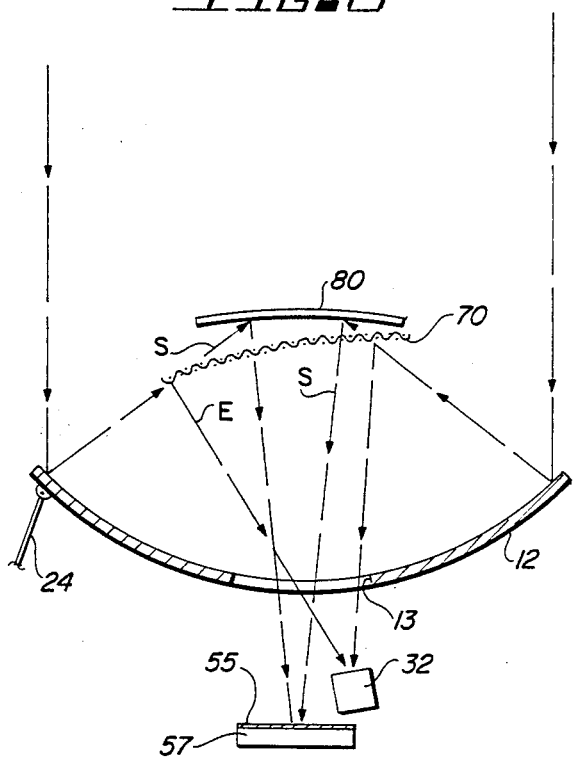
FIG. 8 is still another embodiment of the present invention showing joint use in which the solar radiation and electromagnetic energy are focused at different locations to avoid damage to the amplifier and feed horn.

Another embodiment of the invention incorporating shared use mode of operation is shown in FIG. 8. In FIG. 8 the parabolic dish 12 is again cassegrain design having a central aperture 13 which is again adjustable by means of control arm 24. Feed horn and amplifier assembly 32 are positioned at the rear of the antenna dish in a nonaxial position. Screen 70 is again selected having a mesh size less than one-sixteenth of the wavelength of the signal radiation so that it will appear essentially as a solid reflecting surface to this radiation. Screen 70 is appropriately curved and oriented to redirect signal radiation (E) through aperture 13 to the feed horn and amplifier assembly 32 which is positioned at one side of the central axis of the parabola. Optical reflector 80 is positioned rearward of reflector 70 and is curved to re-direct radiant energy (S) through aperture 13 focusing the radiant energy at a location coincident with the center of the parabola 12 focusing upon the surface 55 of heat exchanger 57 at the rear of the dish.

From the foregoing, it will be seen that the present invention provides a device which can be used in a joint or shared mode with a reflective parabolic dish to achieve both solar concentration and allow the dish to also be used as a communications antenna. Various embodiments are described herein. It will be apparent to those skilled in the art to make various changes, alterations and modifications to the embodiments described herein. To the extent such changes, alterations, and modifications do not depart from the spirit and scope of the appended claims, they are intended to be encompassed therein.

We claim:

1. A combined use solar energy receptor and electromagnetic signal receptor device comprising:
    (a) a generally parabolic dish having a reflective surface for reflecting both solar and electromagnetic energy;
    (b) solar energy conversion means positionable in the path of reflected solar energy rays;
    (c) signal receptor means positioned to receive the reflected electromagnetic energy; and
    (d) means for shielding the signal receptor means from excessive solar energy.

2. A combined use solar energy receptor and electromagnetic signal receptor device comprising:
    (a) a generally parabolic dish having a reflective surface for reflecting both solar and electromagnetic energy toward a focal point;
    (b) solar energy receptor means positioned in the path of reflected solar energy rays; and
    (c) signal receptor means removably positioned between said solar energy conversion means and said dish whereby said signal receptor means is detachable during periods of predetermined higher solar radiation to prevent damage thereto.

3. The device of claim 2 wherein said solar energy receptor means comprises a heat exchanger.

4. The device of claim 2 further including control means for controlling the orientation of said dish relative to the sun and a remote satellite station.

5. A combined use solar energy receptor and electromagnetic signal receptor device comprising:
    (a) a generally parabolic dish having a reflective surface for reflecting both solar and electromagnetic energy toward a focal point;
    (b) signal receptor means positioned at the approximate focal point; and
    (c) solar energy receptor means detachably positioned in the path of reflected solar energy between said signal receptor and said dish whereby said solar energy receptor means may be selectively interposed ahead of said signal receptor during periods of predetermined high solar flux.

6. A combined use solar energy receptor and electromagnetic signal receptor comprising:
    (a) a generally parabolic dish having a front reflective surface for reflecting both solar and electromagnetic energy and a rear surface, said dish defining a central aperture;
    (b) signal receptor means positioned at the approximate focal point of said reflective surface;
    (c) solar energy receptor means positioned at the rear side of said dish adjacent said aperture; and
    (d) secondary solar energy reflector means selectively positionable between said dish and said signal receptor to redirect solar rays to impinge on said solar energy receptor during periods of predetermined high solar flux.

7. The device of claim 6 wherein said solar energy receptor is removable and said signal receptor is positioned at the rear of said dish.

8. A combined use solar energy receptor and electromagnetic signal receptor comprising:
(a) a generally parabolic dish having a front reflector surface for reflecting both solar and electromagnetic energy, said dish defining a central aperture;
(b) solar energy receptor means positioned to receive reflected solar energy at the front of said dish;
(c) signal receptor means located at the rear of said dish in line-of-sight with said aperture; and
(d) selective energy reflector means interposed ahead of said solar energy receptor means for selectively re-directing electromagnetic energy to said signal receptor means and permitting solar energy to impinge on said solar energy receptor means.

9. The device of claim 8 wherein said solar energy receptor comprises a selective coating on said solar energy receptor.

10. The device of claim 8 wherein said energy selective means comprises a screen interposed between said dish and said solar energy receptor which screen has a predetermined mesh size to selectively pass-through energy of predetermined wavelength.

11. The device of claim 10 wherein the mesh size is selected as less than one-sixteenth of the wave length of the electromagnetic energy.

12. A combined use solar energy receptor and electromagnetic signal receptor comprising:
(a) a generally parabolic dish having a front reflective surface for reflecting both solar and electromagnetic energy and having a rear surface, said dish defining an aperture therein;
(b) solar energy receptor means positioned at the rear of said dish in line-of-sight with said aperture;
(c) signal receptor means positioned at the rear of said dish in line-of-sight with said aperture;
(d) optical sub-reflector means positioned to receive solar energy and redirect said energy to said solar energy receptor means via said aperture; and
(e) signal sub-reflector means positioned to receive electromagnetic energy and redirect said energy to said signal receptor means via said aperture.

* * * * *